(12) United States Patent
Soliño Testa et al.

(10) Patent No.: US 8,484,738 B2
(45) Date of Patent: Jul. 9, 2013

(54) SYSTEM AND METHOD FOR PROVIDING APPLICATION PENETRATION TESTING

(75) Inventors: Alberto Gustavo Soliño Testa, Buenos Aires (AR); Gerardo Gabriel Richarte, Buenos Aires (AR); Fernando Federico Russ, Buenos Aires (AR); Diego Martin Kelyacoubian, Buenos Aires (AR); Ariel Futoransky, Buenos Aires (AR); Diego Bartolome Tiscornia, Buenos Aires (AR); Ariel Waissbein, Buenos Aires (AR); Hector Adrian Manrique, Buenos Aires (AR); Javier Ricardo De Acha Campos, Buenos Aires (AR); Eduardo Arias, Buenos Aires (AR); Sebastian Pablo Cufre, Buenos Aires (AR); Axel Elián Brzostowski, Buenos Aires (AR)

(73) Assignee: Core SDI Incorporated, Boston, MA (US)

(*) Notice: Subject to any disclaimer, the term of this patent is extended or adjusted under 35 U.S.C. 154(b) by 1005 days.

(21) Appl. No.: 12/043,673

(22) Filed: Mar. 6, 2008

(65) Prior Publication Data
US 2008/0263671 A1   Oct. 23, 2008

Related U.S. Application Data

(60) Provisional application No. 60/905,253, filed on Mar. 6, 2007.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .............................................. 726/25; 726/23

(58) Field of Classification Search
USPC ........................................................ 726/25
See application file for complete search history.

(56) References Cited

U.S. PATENT DOCUMENTS 7,185,232 B1 * 2/2007 Leavy et al. .................... 714/41
(Continued)

FOREIGN PATENT DOCUMENTS

WO    WO2004031953 A    4/2004

OTHER PUBLICATIONS

Jensen I: "Appscan Developer Edition 1.7 FAQ" Internet Citation, [online] Sep. 5, 2003, pp. 1-14, XP002489815 Retrieved from the Internet: URL: http://www.coadlettercom/article/borcon/files/sefiles/sanctum/AppScan_DE_FAQ.pdf>.

(Continued)

*Primary Examiner* — Carolyn B Kosowski
(74) *Attorney, Agent, or Firm* — Peter A. Nieves; Sheehan Phinney Bass & Green PA (57) ABSTRACT

A system and method provide application penetration testing. The system contains logic configured to find at least one vulnerability in the application so as to gain access to data associated with the application, logic configured to confirm the vulnerability and determine if the application can be compromised, and logic configured to compromise and analyze the application by extracting or manipulating data from a database associated with the application. In addition, the method provides for penetration testing of a target by: receiving at least one confirmed vulnerability of the target; receiving a method for compromising the confirmed vulnerability of the target; installing a network agent on the target in accordance with the method, wherein the network agent allows a penetration tester to execute arbitrary operating system commands on the target; and executing the arbitrary operating system commands on the target to analyze risk to which the target may be exposed.

17 Claims, 8 Drawing Sheets

U.S. PATENT DOCUMENTS

| | | | |
|---|---|---|---|
| 7,487,149 B2 * | 2/2009 | Wong | 1/1 |
| 7,558,796 B1 * | 7/2009 | Bromwich et al. | 1/1 |
| 7,640,235 B2 * | 12/2009 | Shulman et al. | 1/1 |
| 7,690,037 B1 * | 3/2010 | Hartmann | 726/23 |
| 7,712,137 B2 * | 5/2010 | Meier | 726/25 |
| 7,774,361 B1 * | 8/2010 | Nachenberg et al. | 707/779 |
| 7,818,788 B2 * | 10/2010 | Meier | 726/4 |
| 7,860,842 B2 * | 12/2010 | Bronnikov et al. | 707/690 |
| 7,934,253 B2 * | 4/2011 | Overcash et al. | 726/22 |
| 8,046,374 B1 * | 10/2011 | Bromwich | 707/759 |
| 2002/0010855 A1 | 1/2002 | Reshef et al. | |
| 2003/0009696 A1 | 1/2003 | Bunker et al. | |
| 2004/0128667 A1 | 7/2004 | Caceres et al. | |
| 2005/0138426 A1 * | 6/2005 | Styslinger | 713/201 |
| 2005/0251863 A1 * | 11/2005 | Sima | 726/25 |
| 2005/0273859 A1 * | 12/2005 | Chess et al. | 726/25 |
| 2005/0273860 A1 * | 12/2005 | Chess et al. | 726/25 |
| 2006/0090206 A1 * | 4/2006 | Ladner et al. | 726/25 |
| 2006/0212941 A1 * | 9/2006 | Bronnikov et al. | 726/24 |
| 2007/0074169 A1 * | 3/2007 | Chess et al. | 717/126 |
| 2007/0130620 A1 * | 6/2007 | Pietraszek et al. | 726/22 |
| 2007/0156644 A1 * | 7/2007 | Johnson et al. | 707/2 |
| 2007/0214503 A1 * | 9/2007 | Shulman et al. | 726/22 |
| 2008/0034424 A1 * | 2/2008 | Overcash et al. | 726/22 |
| 2011/0173693 A1 * | 7/2011 | Wysopal et al. | 726/19 |
| 2012/0072968 A1 * | 3/2012 | Wysopal et al. | 726/1 |
| 2012/0102114 A1 * | 4/2012 | Dunn et al. | 709/204 |
| 2012/0117644 A1 * | 5/2012 | Soeder | 726/22 |

OTHER PUBLICATIONS

Ofer Maor, Amichai Shulman, Blindfolded SQL Injection, Internet Article, www.webcohort.com/Blindfolded_SQL_Injection.pdf, Sep. 5, 2003, pp. 1-16, Webcohort, Israel.

Jensen, I, Appscan Developer Edition 1.7 FAQ, internet article, www.coadletter.com/article/borcon/files/sefiles/sanctum/AppScan_De_FAQ.pdf., retrieved Jul. 24, 2008, Sep. 5, 2003, pp. 1-14, Sanctum Inc.

Santum Announces First Security Testing Tool to Integrate with Microsoft.NET Framework and Java Development Environments, Business Wire, Jun. 17, 2003, pp. 1-3, Santa Clara, CA.

Stewart, A J, Distributed Metastasis: A Computer Network Penetration Methodology, internet article, www.csee.umbc.edu/cadip/docs/NetworkIntrusion/distributed_metastasis.pdf, retrieved Apr. 19, 2005, Aug. 12, 1999, pp. 1-11.

Melbourne, J., Jorm, D., Penetration Testing for Web Applications (Part One), internet article, www.securityfocus.com/infocus/1709, retrieved Jul. 24, 2008, pp. 5.

Melbourne, J., Jorm, D., Penetration Testing for Web Applications (Part Two), internet article, www.securityfocus.com/infocus/1704, retrieved Jul. 24, 2008, pp. 5.

Melbourne, J., Jorm, D., Penetration Testing for Web Applications (Part Three), internet article, www.securityfocus.com/infocus/1722, retrieved Jul. 24, 2008, pp. 4.

Lemos, R., Question regarding articles posted on securityfocus.com, mail@robertlemos.com, Jul. 24, 2008, pp. 1.

* cited by examiner

SYSTEM AND METHOD FOR PROVIDING APPLICATION PENETRATION TESTING

CROSS-REFERENCE TO RELATED APPLICATION

This application claims priority to U.S. Provisional Application entitled, "SYSTEM AND METHOD FOR PROVIDING A WEB APPLICATION PENETRATION TESTING FRAMEWORK," having Ser. No. 60/905,253, filed Mar. 6, 2007, which is entirely incorporated herein by reference.

FIELD OF THE INVENTION

The present invention is generally related to Internet security, and more particularly is related to data security due to application penetration.

BACKGROUND OF THE INVENTION

Internet security has been of concern for quite some time. Of particular concern is Web application security and preventing end users from stealing or modifying data stored in Web servers or in locations associated with Web servers. Historically, to obtain access to the data, attacking end users (hereafter, attackers) would find network vulnerabilities in the Web server and capitalize on such vulnerabilities. Web server security has increased significantly, resulting in attackers seeking access to Web server data in different ways. New trends in security have long enlarged network penetration testing practices to spaces, such as, but not limited to, Web applications, wireless devices, voice over IP (internet protocol) products, and other fields.

Figure 1:
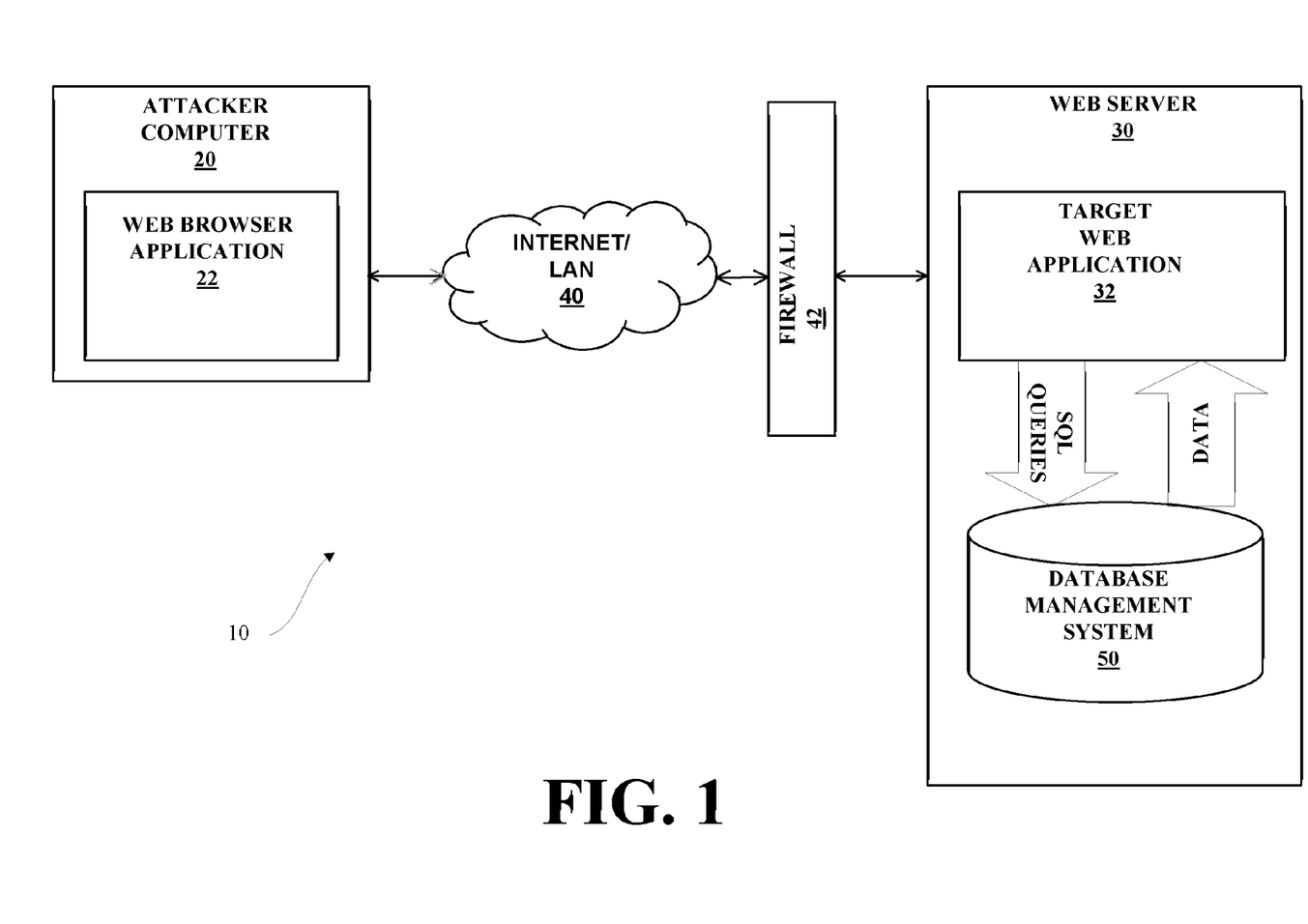

One area of particular interest to attackers is Web application security. Specifically, attackers presently use vulnerabilities in Web applications to obtain access to Web server data, resulting in the attackers being able to steal or manipulate the data. For exemplary purposes, FIG. 1 is provided, which is a schematic diagram illustrating an example of a prior art network 10. As shown by FIG. 1, the network 10 contains an attacker computer 20 that is used by an attacker to interact with the network 10 and gain access to data within a Web server 30. The attacker computer 20 has a Web browser application 22 stored therein, where the Web browser application 22 is capable of communicating with a target Web application 32 stored within the Web server 30. The attacker computer 20 is capable of connecting to the Web server 30 via the Internet 40 or a local area network. Access to the Web server 30 may be controlled by a firewall 42, which may be either a software application stored at the Web server 30 or a separate device.

As mentioned above, the Web server 30 has a target Web application 32 stored therein. The target Web application 32 controls access to a database management system 50 through SQL queries or other manners. Data associated with the target Web application 32 is stored within the database management system 50 in tables that are located within a database of the database management system 50.

As mentioned above, the modern and typical development techniques invariably insert security vulnerabilities in Web applications that can be exploited by Web users (attackers) that connect to these Web applications (e.g., through the Internet). As a result of these exploits, an attacker could access private information that is located in the Web servers (e.g., credit card databases), or modify the information displayed by these Web applications. Such modification can be used for purposes of defacing the underlying Web application, thus creating a denial of service to standard users and damaging the public image of the owner of the Web application. In addition, the modification may be used to attack other Web users of this Web application (that trust the content displayed by the Web application). Although the latter is one of the so-called client-side exploits, it also shows a vulnerability in the Web application landscape. Hence, these types of attacks can be used to test both client security and Web application security.

These attacks are performed by attackers that pass themselves as standard Web users that go outside the standard procedure in their interaction with the Web application, typically inserting specially-crafted data in Web entries, which results in them having new capabilities that are not contemplated in the Web application design. For example, referring to one type of application attack, among many, an SQL-injection attack can be realized by an attacker that accesses a Web application and types an SQL command, when in fact, a user of the Web application should be typing his name, or telephone number. This SQL command Web entry is not checked and sanitized by the Web application, and it is passed to the database management system, which executes this command, when in fact, no Web user should be able to execute database commands.

Thus, a heretofore unaddressed need exists in the industry to test for and address the aforementioned deficiencies and inadequacies.

SUMMARY OF THE INVENTION

Embodiments of the present invention provide a system and method for providing application penetration testing. Briefly described, in architecture, one embodiment of the system, among others, can be implemented as follows. The system contains logic configured to find at least one vulnerability in the application so as to gain access to data associated with the application, logic configured to confirm the vulnerability and determine if the application can be compromised, and logic configured to compromise and analyze the application by extracting or manipulating data from a database associated with the application.

The present invention can also be viewed as providing methods for providing penetration testing of a target. In this regard, one embodiment of such a method, among others, can be broadly summarized by the following steps: receiving at least one confirmed vulnerability of the target; receiving a method for compromising the confirmed vulnerability of the target; installing a network agent on the target in accordance with the method, wherein the network agent allows a penetration tester to execute arbitrary operating system commands on the target; and executing the arbitrary operating system commands on the target to analyze risk to which the target may be exposed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the FIG. 1 is a schematic diagram illustrating an example of a prior art network in which a Web server application attacker may interact.

DETAILED DESCRIPTION

The present system and method provides an application penetration-testing framework that allows a testing end user to test for target application vulnerabilities. It should be noted that, for exemplary purposes, the present description is provided with regard to the application being a Web application, however, the application need not be a Web application. In addition, it should also be noted that the example used within the present description refers to an SQL injection attack, however, one having ordinary skill in the art would realize that other application attacks may also be provided for by the present system and method.

Figure 2:
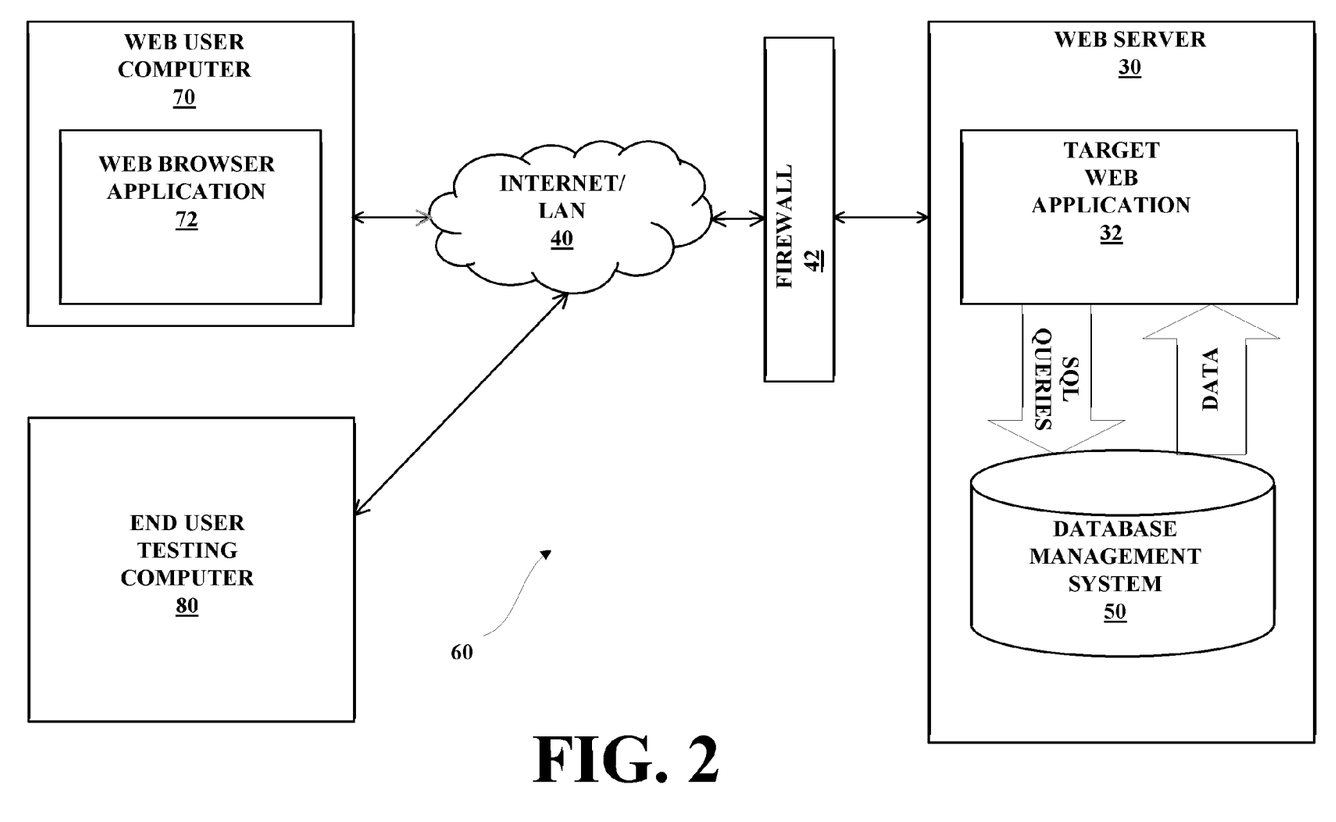
FIG. 2 is a schematic diagram illustrating an example of a network in which the present penetration tester may be provided.

FIG. 2 is a schematic diagram illustrating an example of a network in which the present penetration tester may be provided. It will be noticed that many portions of the network are similar to the prior art network of FIG. 1. As shown by FIG. 2, the network 60 contains an end user testing computer 80 that is used by a penetration testing end user to interact with the network 60, determine if there are vulnerabilities to an associated database, exploit such vulnerabilities, analyze the risk the vulnerabilities generate, clean-up, and report. The end user testing computer 80 is described in further detail below.

The network 60 may also contain a Web user computer 70 that has a Web browser application 72 stored therein, where the Web browser application 72 is capable of communicating with the target Web application 32 stored within the Web server 30. Both the end user testing computer 80 and the Web user computer 70 are capable of connecting to the Web server 30 via the Internet 40 or a local area network. Access to the Web server 30 may be controlled by a firewall 42, which may be either a software application stored at the Web server 30 or a separate device. It should be noted that the network may have one, none, or many Web user computers connected therein.

As mentioned above, the Web server 30 has a target Web application 32 stored therein. The target Web application 32 controls access to a database management system 50 through SQL queries or other manners. Data associated with the target Web application 32 is stored within the database management system 50 in tables that are located within a database of the database management system 50. The Web user uses his Web browser application (e.g., Internet Explorer) to see material hosted in the target Web application 32 and interact with it. In addition, the end user performing penetration testing interacts with the target Web application 32 through the end user testing computer 80.

Figure 3:
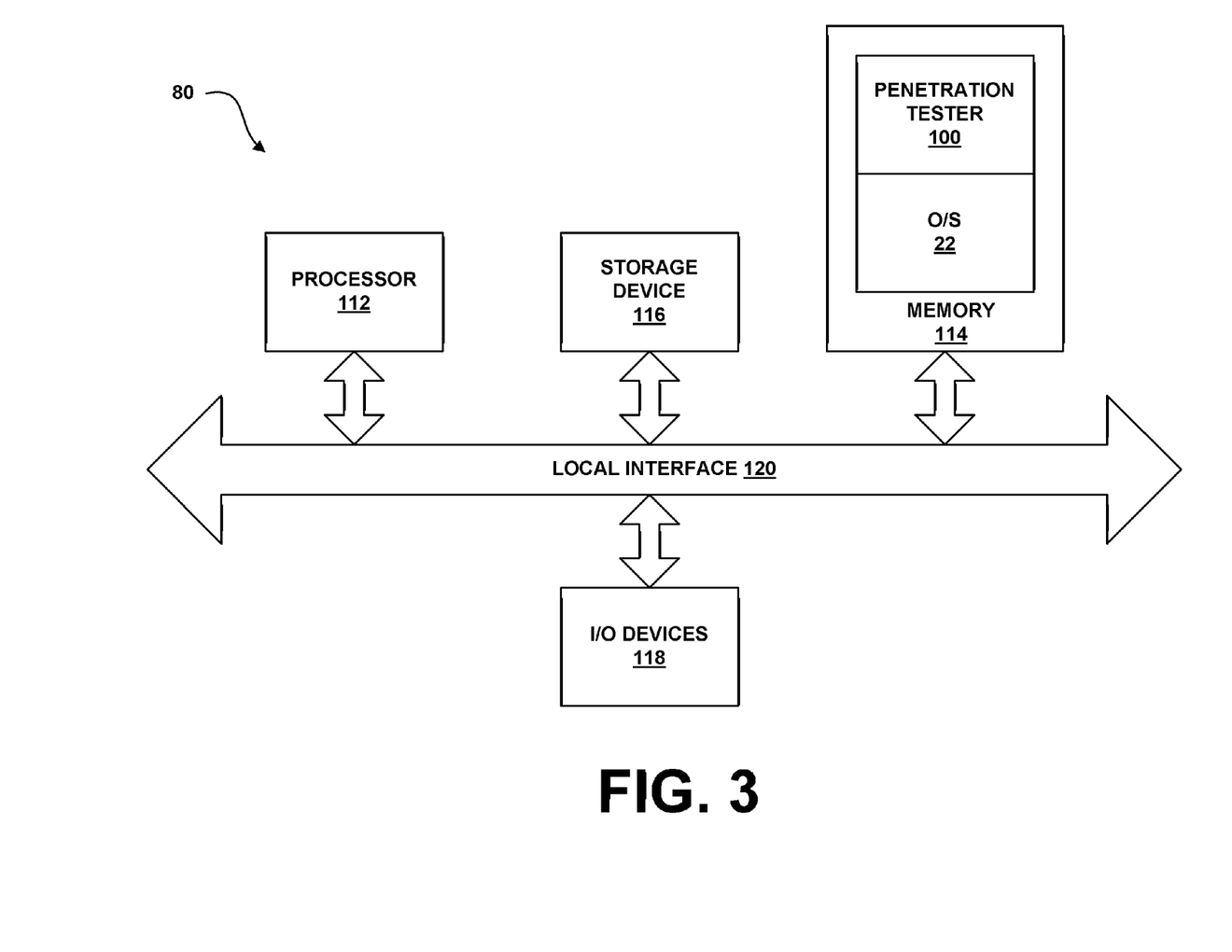
FIG. 3 is a block diagram further illustrating the end user testing computer of FIG. 2.

FIG. 3 is a block diagram further illustrating the end user testing computer 80 of FIG. 2. It should be noted that the penetration tester 100 of the present invention can be implemented in software (e.g. firmware), hardware, or a combination thereof. In the currently contemplated best mode, as mentioned in the description of FIG. 3, the penetration tester 100 is implemented in software, as an executable program, and is executed by a special or general prose digital computer (e.g., the end user testing computer 80), such as a personal computer (PC; IBM-compatible, Apple-compatible, or otherwise), workstation, minicomputer, or mainframe computer. Further description of the penetration tester 100, and interaction therewith is provided below.

Generally, in terms of hardware architecture, as shown in FIG. 3, the end user testing computer 80 may includes a processor 112, memory 114, storage device 116, and one or more input and/or output (I/O) devices 118 (or peripherals) that are communicatively coupled via a local interface 120. The local interface 120 can be, for example but not limited to, one or more buses or other wired or wireless connections, as is known in the art. The local interface 120 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 112 is a hardware device for executing software, particularly that stored in the memory 114. The processor 112 can be any custom made or commercially available processor, a central processing unit (CPU), an auxiliary processor among several processors associated with the computer 80, a semiconductor based microprocessor (in the form of a microchip or chip set), a macroprocessor, or generally any device for executing software instructions.

The memory 114 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 114 may incorporate electronic, magnetic, optical, and/or other types of storage media. Note that the memory 114 can have a distributed architecture, where various components are situated remote from one another, but can be accessed by the processor 112.

Software within the memory 114 may include one or more separate programs, each of which comprises an ordered listing of executable instructions for implementing logical functions of the recruitment system, as described below. In the example of FIG. 3, the software in the memory 14 defines the penetration tester 100 functionality, in accordance with the present invention. In addition, the memory 14 may contain an operating system (O/S) 122. The operating system 122 essentially controls the execution of computer programs and provides scheduling, input-output control, file and data management, memory management, and communication control and related services.

The penetration tester 100 may be provided by a source program, executable program (object code), script, or any other entity comprising a set of instructions to be performed. When a source program, then the program needs to be translated via a compiler, assembler, interpreter, or the like, which may or may not be included within the memory 114, so as to operate properly in connection with the O/S 122. Furthermore, the penetration tester 100 can be written as (a) an object oriented programming language, which has classes of data and methods, or (b) a procedure programming language, which has routines, subroutines, and/or functions.

The I/O devices 116 may include input devices, for example but not limited to, a keyboard, mouse, scanner, or microphone. Furthermore, the I/O devices 116 may also include output devices, for example but not limited to, a printer, display, etc. Finally, the I/O devices 116 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the penetration tester 100 is implemented in software, as is shown in FIG. 2 and FIG. 3, it should be noted that the penetration tester 100 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The penetration tester 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 4:
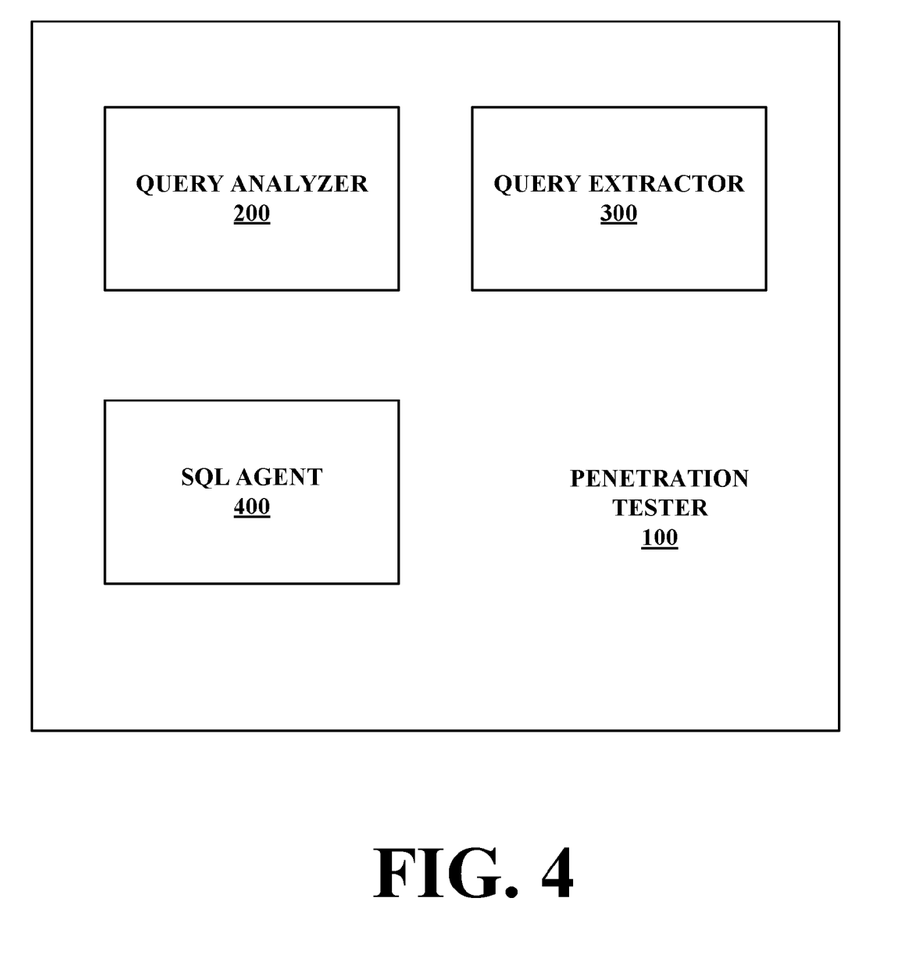
FIG. 4 is a block diagram further illustrating modules of the penetration tester, which are used to find and exploit SQL vulnerabilities of the target Web application.

FIG. 4 is a block diagram further illustrating modules of the penetration tester 100 which are used to find and exploit SQL vulnerabilities of the target Web application 32. As is shown by FIG. 4, the penetration tester 100 at least contains a query analyzer 200, a query extractor 300, and an SQL agent 400. It should be noted that while these modules are described separately, the modules exhibit functionality provided by the penetration tester 100 as a whole. As is known by those having ordinary skill in the art, a Web application seeks data from a database management system by providing SQL queries to the database management system. The SQL queries are then interpreted by the database management system, and the database management system pulls requested data from tables within an associated database. The pulled data is then transmitted from the database management system back to the target Web application. It should be noted that while the present system and method is focused on the example of SQL queries, the present system and method is not intended to be limited to SQL queries exclusively. Instead, the present system and method may be provided for interaction with a Web server that provides for different queries between a target Web application and a database management system.

Figure 5:
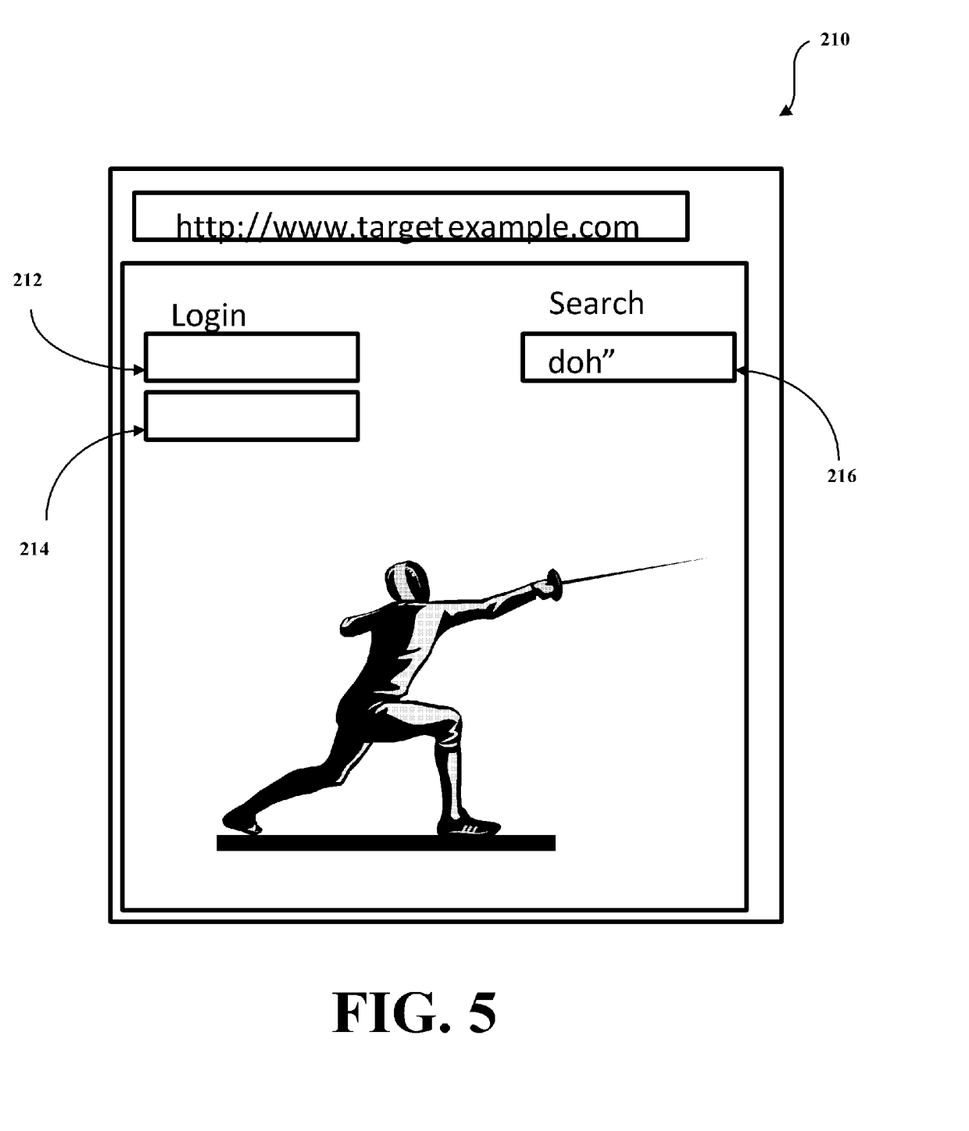
FIG. 5 is a schematic diagram illustrating an example of a Web site having data entry points.

The following description of the penetration tester 100 is provided with reference to an example of interacting with a Web site (FIG. 5) having at least one data entry point. As is known by those having ordinary skill in the art, a data entry point is a point in a Web site that accepts data from an end user, which is provided to an associated Web application. Referring to the example of a Web site 210 provided by FIG. 5, the Web site 210 contains two login data entry points 212, 214 and a single search data entry point 216.

Query Analyzer

The query analyzer 200 is used to find vulnerabilities in the target Web application 32 so as to gain access to the Web server 30 and data stored therein. To find vulnerabilities in the target Web application 32 the query analyzer 200 uses data entry points of the target Web application, such as the data entry points 212, 214, 216 of the Web site 210 of FIG. 5. Specifically, in terms of communication between the end user testing computer and the target Web application 32, the query analyzer 200 may use HTTP requests, such as, but not limited to, POST requests and GET requests). It should be noted that this example is for Web browser-Web application interaction. Alternatively, for non-Web applications other applications may use protocols for communication such as, but not limited to, HTTP, Session Initiation Protocol (SIP), and Simple Object Access Protocol (SOAP).

Figure 6:
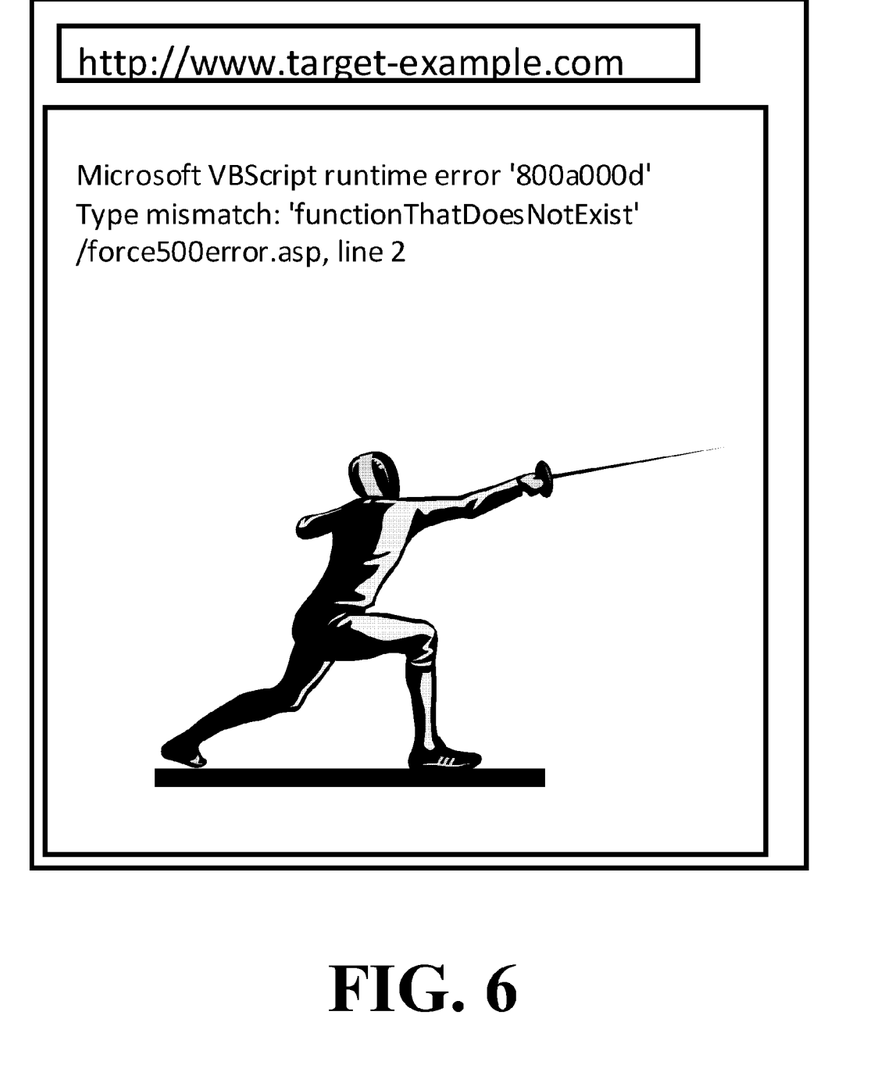
FIG. 6 is a schematic diagram providing an example of a returned error message provided by a Target Web application.

To determine vulnerabilities, the query analyzer 200 uses a predefined set of strings that may be stored within the storage device 116. Each string is populated into each data entry point of the target Web application 32 and uploaded to the target Web application. A determination is then made as to whether an irregularity is detected, such as, an error message being returned by the target Web application in response to a used string. It should be noted that the following uses the example of an error message returned, while one having ordinary skill in the art would appreciate that other irregularities may be supplemented. An example of a returned error message is provided by the screen of FIG. 6. As a result, the query analyzer 200 uses a trial and error process to obtain error messages such as, but not limited to, a database error or an ASP server error messages. If the query analyzer 200 receives an error message, the query analyzer knows that the target Web application has vulnerabilities and it knows what data entry point is associated with the vulnerability. The query extractor 300 may then be used to determine the type of vulnerability to which the target Web application 32 is vulnerable.

In accordance with an alternative embodiment of the invention, the query analyzer 200 learns how to avoid countermeasures of the Web application and the query analyzer provides this information to the SQL agent 400. As an example, the fuzz vectors can help to evade countermeasures. The following provides an example of how fuzz vectors can help to evade countermeasures. It is assumed that the target Web application 32 will sanitize all user-provided data that goes to the database management system 50 by removing the characters that stand for semicolons and quotes. However, it might be the case that the target Web application 32 does not check for other encodings (e.g., hexadecimal, unicode), so that by converting a standard fuzz vector to this new encoding (e.g., instead of sending Bob' OR 1=1 we send the result of encode (Bob' OR 1=1) the text of the tester will not be sanitized by the target Web application 32 and the text will be casted back to the offending value (Bob' OR 1=1 in the above example) before it gets to the database management system 50.

Query Extractor

The query extractor 300 is used to determine relationships between SQL queries and inputted strings. Specifically, the query extractor 300 is capable of determining what SQL query is transmitted by the target Web application 32 to the database management system 50 as a result of the target Web application 32 receiving a specific script, after the script was entered into a data entry point and received by the target Web application 32.

The query extractor 300 finds an SQL-injection vulnerability of the target Web application 32 and a way to exploit the vulnerability. As mentioned above, given a Web page and a data entry point, the query extractor 300 looks for vulnerability in the target Web application 32 via use of the data entry point returned by the query analyzer 200. For the selected data entry point, the query extractor 300 sends several pre-computed and stored character strings, thereby attempting to discover whether there actually is a target Web application 32 vulnerability, and whether the query extractor 300 can turn this vulnerability into an SQL agent 400.

To perform the abovementioned, the query extractor 300 uses the already mentioned predefined and stored set of strings, examples of which include fuzz vectors. When one of these strings is entered in a data entry point, the response given by the target Web application 32 allows the query extractor 300 to answer one of several questions. Specifically, the query extractor 300 is capable of using a table stored within the storage device 116 that contains typical answers provided by a Web application after the Web application receives certain strings and what such typical answers mean. As the query extractor 300 receives answers from the target Web application 32, a program stored within the query extractor 300 searches the table of typical answers and associated meanings so that the query extractor 300 can answer certain questions. It should be noted that it may take multiple received answers to multiple strings to derive an answer to a question.

Examples of such questions include, but are not limited to:
is there something indicative of a vulnerability (e.g., a database error)?;
what database management system is this (e.g., MS SQL, MySQL, Oracle)?;
what SQL query is being executed by the target Web application (e.g., select, insert, delete)?; and
in what part of the SQL query does the input string go? For example a typical SQL query is:
SELECT * FROM input[1] where FIELD1=input[2] AND (FIELD2=input[3] OR FIELD3=input[4]);
It is then valuable to know if the input string goes in the FROM clause of the SQL query or in the WHERE clause. If the input string goes to the WHERE clause, it is valuable to know what formula is being evaluated by the database management system (e.g., A AND (B OR C) in the above example, and we need to know if the input entered goes to A or B/C).
Other questions may include:
Can we extract some data?;
What is the number of columns in the database table that queries are being made to? (e.g., a username-password table will have two columns, a name-surname-age has 3, etc.); and
What is the type of each column (e.g., 32 characters of text, number)?

After answering many questions including, but not restricted to, those mentioned above, by using strings that are known to provide specific results, the query extractor 300 can manipulate the target Web application 32 to elicit the SQL query of its choice. In addition, the query extractor 300 can parse through the answers returned by the target Web application 32 (e.g., upon an answer, the target Web application might be answering all the information accessed in the attack concatenated in one string; to cope with this limitation, the SQL agent 400 translates this concatenation of values to a table). Explicitly, the query extractor 300 attempts to make some SQL queries and check the answers it obtains to determine whether it can execute arbitrary SQL queries in the target database management system 50. In doing so, the query extractor 300 finds out how to translate any given SQL query to the string that should be entered in the data entry point to get the query executed.

The following provides an example of the query extractor 300 actions. For the present example, it is assumed that the only sanitization done by the database management system 50 is commenting quotation marks with slashes. Let us say that the SQL query being executed by the database management system 50 is
SELECT * FROM USERS WHERE uid='sanitizedInput';
Here, sanitizedInput stands for the result obtained after passing the Web user's input through the already mentioned sanitization function. In order to execute the query
SELECT * FROM users WHERE uid='Tom' OR 1=1; (*)
that will return all of the table named users, the attacker will enter the string
Tom\' OR 1=1\
The result after sanitizing this will then be
Tom\\' OR 1=1\
And will result in the following SQL query:
SELECT * FROM users WHERE uid='Tom\\' OR 1=1\';
It should be noticed that the two slashes that follow Tom can be removed, since the first one comments the second one and thus they have no effect, and that the slash at the end of the query is commenting the quotation mark, so that both characters have no effect. Therefore this SQL query is equivalent (in terms of the code that is interpreted by the database management system) to (*).

If it is desired to execute SQL command drop guests in the target Web application of the above example and through the same data entry point, then the following string is to be entered. It should be noted that one having ordinary skill in the art would understand how this string generalizes to other SQL queries. As is known, drop is an SQL command used for deleting a table and in this case it would delete from the database the table named guests.
Doh\'; drop guests\
This string will be sanitized and the result is in the following SQL query:
SELECT * FROM users WHERE uid='Doh\\'; drop guests\';
Taking into account what characters are commented we can see that this string is equivalent (in terms of the code that is interpreted by the database management system 50) to the string
SELECT * FROM users WHERE uid='Doh'; drop guests;
Thereafter, the query extractor 300 creates the SQL agent 400

SQL Agent

After having completed the answering of questions associated with the relationship between the target Web application 32 and the database management system 50, the process of exploiting the SQL injection vulnerability in order to make SQL queries of the testing end user choice is known. As a result, the SQL agent creates a new string that is capable of exploiting the SQL injection vulnerability of the target Web application 32 vulnerability without requiring the end user testing the target Web application 32 to continuously enter a string that is capable of exploiting the SQL injection vulnerabilities. Furthermore, by allowing the testing end user to write commands as if he were an authorized database management system 50 user, given any attack module that requires making queries, the SQL agent 400 lets the testing end user run the attack module and transparently make the queries and return the answers for the attack module.

The SQL agent 400 knows how to format SQL queries of the targeting end user so that the SQL queries are passed from the target Web application 32 to the database management system 50 as if the SQL queries were received from an authorized user of the database management system 50.

After the SQL-injection vulnerability has been successfully exploited and an SQL agent has been successfully provided, the risk provided by the SQL injection vulnerability is assessed. Testing end user actions may fall into one of two classes. A first class may be data extraction, which relates to listing the names for the different tables in the database of the database management system 50, extracting these tables, and performing other functions with the tables. In the case of data extraction, the penetration tester 100 contains a menu of data extraction primitives that can be selected by the testing end user, and, on selecting the primitives, for example, through a graphical user interface, the penetration tester 100 executes necessary actions to fulfill data extraction from the database management system 50 database and present back the sought information to the penetration tester 100 (e.g., for including in a testing end user penetration test report).

As is known by those having ordinary skill in the art, a data extraction primitive is a module (i.e., script) containing one or more SQL commands. Examples of functionalities associated with the SQL commands may include, but are not limited to, obtaining the names for all tables in the database management system 50 database, obtaining the columns for a given table, retrieving a given table, inserting a new username and password in a username-password table, and obtaining a minishell. Obtaining a minishell includes, opening a shell window, having any command typed in the window to be executed, by way of the SQL agent, in the target database management system, and returning answers to the shell window.

Selecting of the primitives via the graphical user interface (GUI) may be provided by the GUI having a "flap" listing the primitives. When the SQL agent 400 is installed, the testing end user is allowed to click on the primitives. The testing end user, who is using the penetration tester 100 will then see results in a log window within the GUI, or see a new window with a minishell. The SQL agent 400 acts as an interface between the penetration tester 100 and the database management system 50. As a module is executed, the script interpreter executes command by command. For each SQL command, the module calls the SQL agent 400 with the command, and the AQL agent 400 makes all that is needed to have the command executed in the database management system 50 and return the answer in the appropriate format to the script interpreter.

A second class that testing end user actions may fall into is arbitrary SQL command execution. Specifically, the testing end user can access all of the SQL commands for the database management system under attack, and in particular, he can run OS commands, which is a capability provided by many database management systems, including MS SQL and Oracle. In turn, this will allow the testing end user to install network agents as described in issued U.S. Pat. No. 7,228, 566, entitled "Automated Computer System Security Compromise", having a filing date of Jan. 22, 2002, U.S. patent application Ser. No. 10/621,840, entitled "Distributed computing using syscall proxying, each of which are incorporated by reference herein in their entirety. To do this, once the SQL agent 400 is installed, the SQL agent 400 will issue the necessary OS commands to download (using the already existent channel through which the SQL queries are executed) the executable code for the network agent into the target web server and then execute it. It should be noted that in accordance with an alternative embodiment of the invention, if the current Web server is connected to another Web server, an addition network agent may be installed within the second Web server to allow access to the second Web server. This is due to their typically being less security between reciprocating Web servers.

Alternatively, if no OS commands can be executed, but there is a known vulnerability in the database management system 50 for which the network penetration testing platform has ready an exploit, the user might launch this exploit in order to compromise the server hosting the database management system 50 and next install a network agent.

Figure 7:
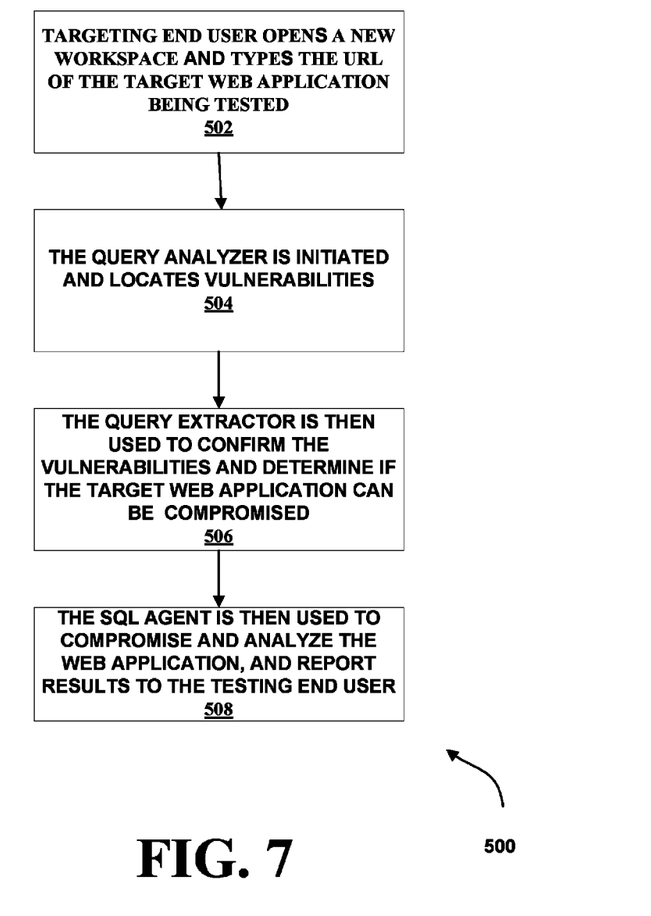
FIG. 7 is a flow chart illustrating steps taken by the present penetration testing framework, in accordance with one exemplary embodiment of the invention.

FIG. 7 is a flow chart 500 illustrating steps taken by the present penetration testing framework, in accordance with one exemplary embodiment of the invention. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Referring to block 502 the testing end user opens a new workspace and types the URL of the target Web application being tested. The query analyzer is then initiated and locates vulnerabilities (block 504). As shown by block 506, the query extractor is then used to confirm the vulnerabilities and determine if the target Web application can be compromised. The SQL agent is then used to compromise and analyze the Web application, and report results to the testing end user (block 508).

The present framework for performing Web application penetration testing contains a network penetration testing framework (NF), and in fact, they share many components. In implementing the Web application penetration testing framework a penetration-testing platform was created (developed). Essentially, this platform has all the common components to both the Network penetration testing framework and the Web application penetration-testing framework. An example of such a network penetration-testing framework is provided by U.S. Pat. No. 7,228,566, entitled "Automated Computer System Security Compromise", having a filing date of Jan. 22, 2002, with is incorporated by reference herein in its entirety.

The present platform constitutes components that will be used by different penetration testing frameworks, including, for example, NF, a Web Application Framework (WAF), a Voice Over IP Framework (VOIPF), a Wireless Framework (WF), and a Supervisory Control And Data Acquisition Framework (SCADAF). It should be understood that the inclusion of these frameworks is exemplary, as the present platform handles other frameworks for performing penetration tests.

The Platform has two basic components, a kernel software development kit and a graphical user interface software development kit. The Platform also includes standard agents (included in the older versions of NF), an execution engine, entities factory and an entities database. The Platform further "wraps" many of these functionalities in a Python execution engine, which profits from specially-developed library of modules. Furthermore, documentation for the kernel and graphical user interface software development kits is provided. This should help a developer wanting to add a new penetration testing framework to the Platform.

EXAMPLE

The following supplies an example that walks through features of the present invention. In the example, a penetration tester is analyzing a target Web application looking for security vulnerabilities. The example describes a new way to exploit a vulnerability with the present invention.

Figure 8:
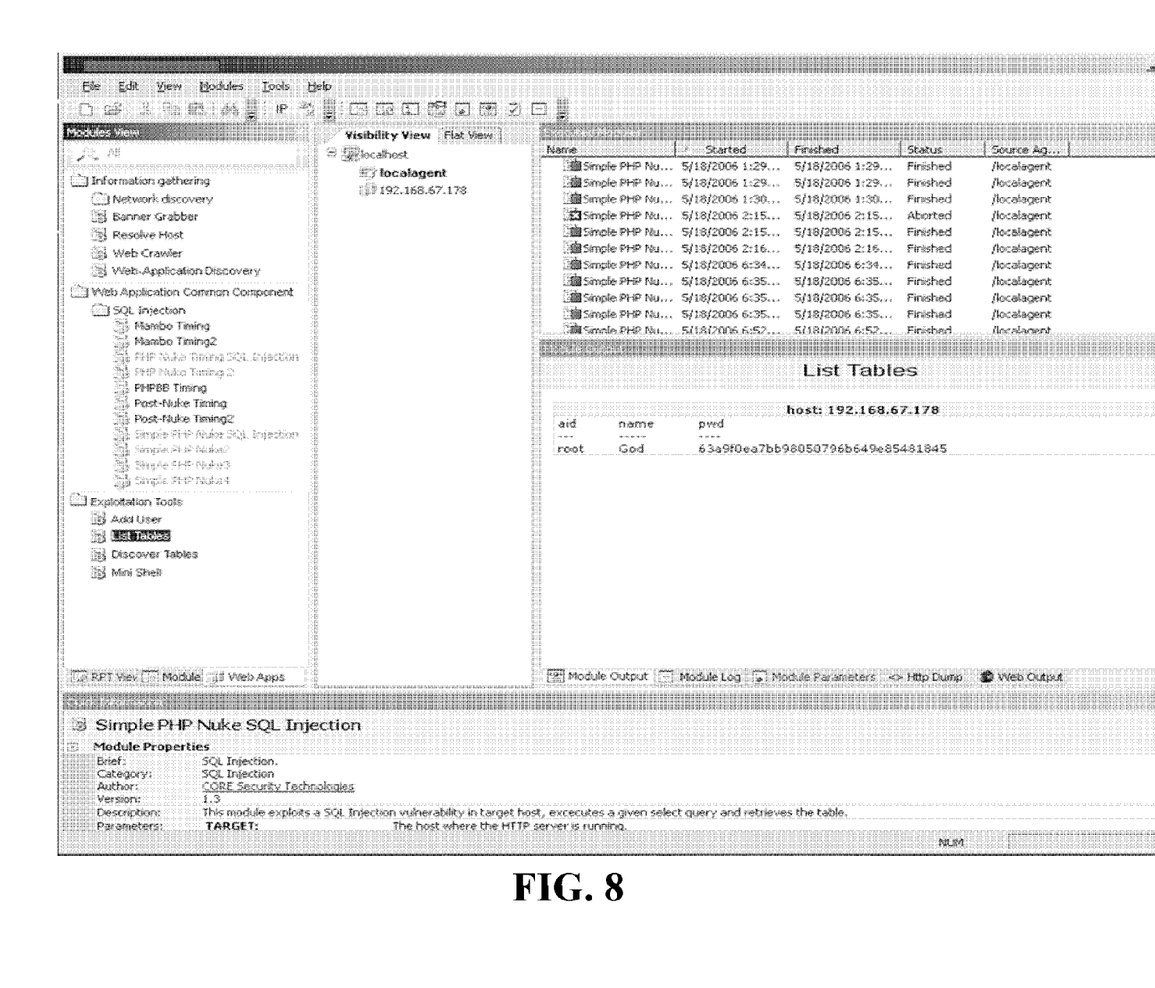
FIG. 8 is an exemplary screen print illustrating results of a lookup of an end user table.

In this example, the user will exploit an SQL injection. As a result the user will be able to install an SQL agent, then use this SQL agent to exploit a second vulnerability using the NF (Network Framework) of the present invention in the Web server and, as a result, install a network agent in this compromised system. In accordance with the present system and method, and example, the following steps are taken:

i. Start and login
   a. The targeting end user will open a new workspace, type the URL of the target Web application being tested, and click on Start Test.
   b. If the target Web application includes an authentication process, the framework will prompt its targeting end user to enter required authentication information or perform the authentication process (e.g., on a text dialog). Whenever the target Web application requires the information, the framework will provide the same.

ii. Vulnerability Detection and Exploitation:
   a. As a result, the present penetration tester will consecutively run the query analyzer to locate a potential vulnerability in a data entry point.
   b. Once a potential vulnerability is detected, the query extractor is started with this data entry point as input. When this ends, the query extractor will have confirmed the vulnerability and detected a way to exploit the vulnerability, and therefore install the SQL agent.
   c. The SQL agent is deployed.

iii. Cascading
   a. Once the SQL agent is deployed, the "Exploitation tools" allow the testing end user to browse the database using information gathering modules (e.g., run the commands "discover tables", "list tables", or "mini shell;" the latter returns an SQL shell that accepts any SQL command and transparently executes this command in the database engine). For example, the screen print of FIG. 8 illustrates the result of a lookup of the end user table.
   b. Taking advantage of a newly discovered vulnerability, the targeting end user might be able to install a (traditional) agent. That is, assume that the database engine includes an exploitable vulnerability and the NF holds an exploit attacking this vulnerability. Then by double-clicking on this exploit module the user will be able to compromise this computer system and install an agent. Notice that the channel used to launch this exploit is made available by the SQL agent.

iv. Report: clicking on the report button will generate the report describing the findings.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A system for providing penetration testing of a target application, comprising:

logic implemented via hardware logic circuitry configured to find at least one database injection vulnerability in said target application so as to gain access to data associated with said target application, wherein said target application contains at least one data entry point, and wherein finding said at least one database injection vulnerability includes using a set of predefined strings that contain at least one of a group consisting of different syntaxes, commands, meta characters and alphanumerical characters to populate each of said at least one data entry points of said target application and using a set of predefined answers associated to each predefined string;

logic implemented via hardware logic circuitry, configured to confirm said at least one database injection vulnerability and determine if said target application can be compromised by using the set of predefined strings to answer questions about the database injection vulnerability including a database management system, syntax of an underlying database command and syntax to compromise said database injection vulnerability wherein the database management system, syntax of the underlying database command and syntax to compromise the database injection vulnerability are determined by answers provided by the target application matched against the set of predefined answers associated to each predefined string; and logic implemented via hardware logic circuitry configured to compromise and analyze said application by extracting or manipulating data from a database associated with said application.

2. The system of claim 1, wherein said target application is a Web application.

3. The system of claim 2, further comprising logic implemented via hardware logic circuitry configured to report results of said analysis.

4. The system of claim 2, further comprising logic implemented via hardware logic circuitry configured to install a first network agent within a first Web server hosting said target application.

5. The system of claim 4, further comprising logic implemented via hardware logic circuitry configured to install a second network agent within a computer device, wherein said computer device is in communication with said first Web server.

6. The system of claim 1, wherein said logic configured to compromise and analyze said target application includes a database query console, wherein said database query console comprises a logic configured to receive arbitrary database queries, execute said arbitrary queries taking advantage of said at least one application vulnerability and returning the results of said queries.

7. The system of claim 1, wherein said logic configured to find at least one database injection vulnerability, said logic configured to confirm said at least one database injection vulnerability, and said logic configured to compromise and analyze said target application run from a local network agent or a remote network agent.

8. The system of claim 7, further comprising logic implemented via hardware logic circuitry configured to execute security exploitation modules in said local and remote agents.

9. A method of providing penetration testing of a target application, comprising the steps of:
   finding at least one database injection vulnerability in said target application so as to gain access to data associated with said target application, wherein said target application contains at least one data entry point, and wherein finding said at least one database injection vulnerability includes using a set of predefined strings that contain at least one of a group consisting of different syntaxes, commands, meta characters and alphanumerical characters to populate each of said at least one data entry points of said target application and using a set of predefined answers associated to each predefined string;
   confirming the at least one potential database injection vulnerability by using the set of redefined stringy s to answer questions about the database injection vulnerability including a database management s stem syntax of an underlying database command and syntax to compromise said database injection vulnerability, wherein the database management system, syntax of the underlying database command and syntax to compromise the database injection vulnerability are determined by answers provided by the target application matched against the set of predefined answers associated to each predefined string;
   receiving at least one arbitrary database query;
   executing the at least one arbitrary query taking advantage of the at least one confirmed database injection vulnerability; and
   returning results of the at least one arbitrary query.

10. The method of claim 9, wherein said target application is a Web application.

11. The method of claim 10, further comprising the step of installing a second network agent on a computer device that is in communication with said web server hosting said target application.

12. The method of claim 9, wherein said at least one confirmed database injection vulnerability is a vulnerability that is susceptible to a database injection attack.

13. The method of claim 9, further comprising the step of installing a network agent on the web server hosting said target application in accordance with said method, wherein said network agent allows a penetration tester to execute arbitrary operating system commands on said web server hosting said target application; and executing said arbitrary operating system commands on said web server hosting said target application to analyze risk to which said target application may be exposed.

14. A system for providing target application penetration testing of a target application, comprising:
   logic implemented via hardware logic circuitry configured to take a description of a database injection vulnerability and exploit a said database injection vulnerability, wherein said exploiting includes confirming said at least one database injection vulnerability and determining if said target application can be compromised by using a set of predefined strings that contain at least one of a group consisting of different syntaxes, commands, meta characters, and alphanumerical characters, to answer questions about the database injection vulnerability including a database management system, syntax of an underlying database command and syntax to compromise the database injection vulnerability, wherein the database management system, syntax of the underlying database command and syntax to compromise the database injection vulnerability are determined by answers provided by the target application matched against a set of predefined answers associated to each predefined string;
   logic implemented via hardware logic circuitry configured to execute arbitrary database commands, wherein said arbitrary database commands are allowed by database access permissions assigned to said compromised target application, by translating these database commands to input accepted by said target application; and
   logic implemented via hardware logic circuitry configured to retrieve the answer to said arbitrary database commands,
   wherein said system runs in an end user computer than can access said target application as an end user.

15. The system of claim 14, wherein said target application is a Web application.

16. The system of claim 15, further comprising logic implemented via hardware logic circuitry configured to install a first network agent within a first Web server hosting said target application.

17. The system of claim 16, further comprising logic implemented via hardware logic circuitry configured to install a second network agent within a computer device, wherein said computer device is in communication with said first Web server.

* * * * *